W. M. STONE
FLEXIBLE DRIVE CONNECTING DEVICE.
APPLICATION FILED SEPT. 10, 1920.
1,385,803.
Patented July 26, 1921.
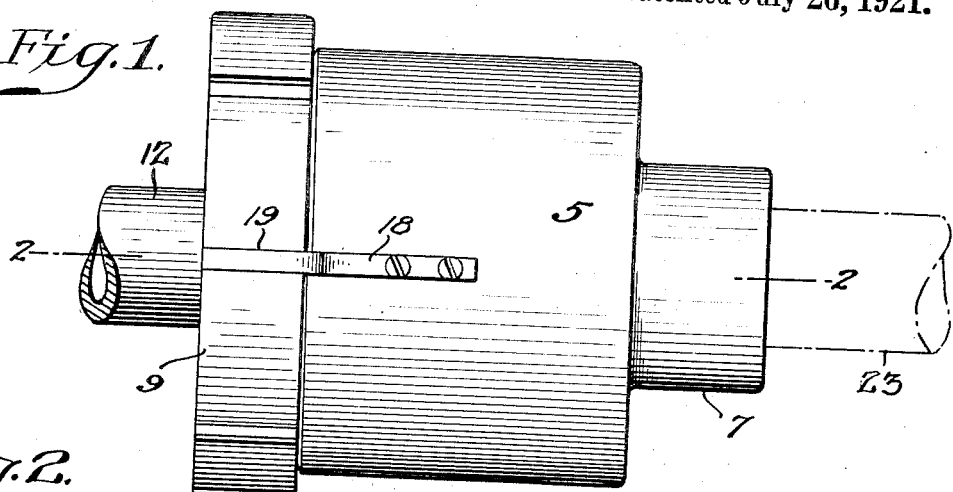
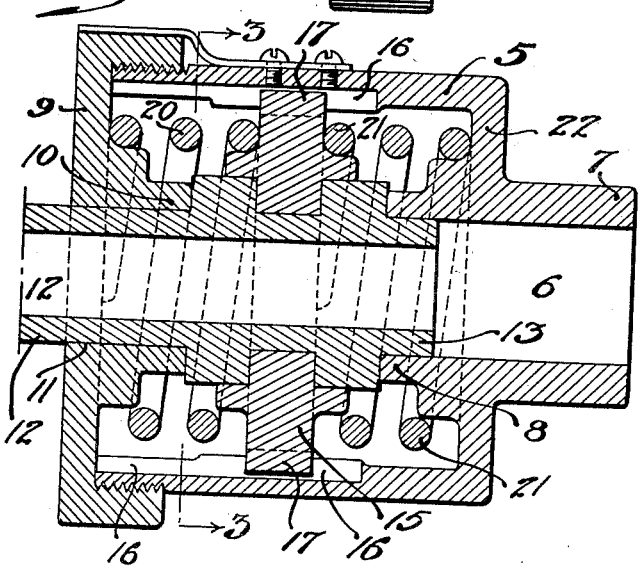
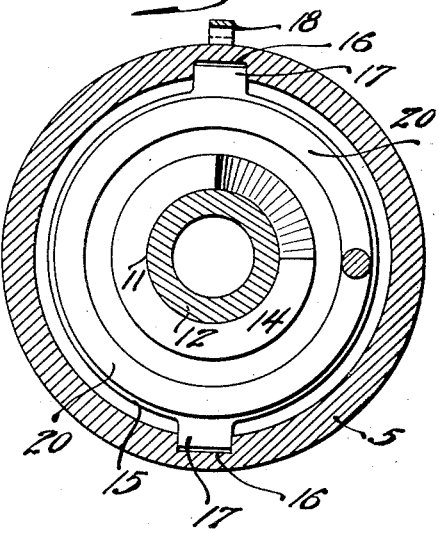
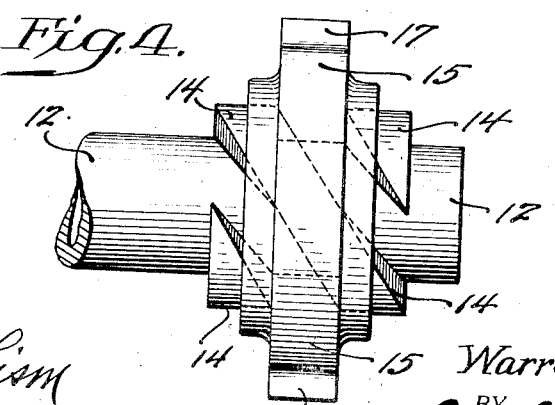
WITNESSES:
Walter Chism
Augustus B. Coppes
INVENTOR.
Warren M. Stone.
BY
Joshua R. H. Potts
ATTORNEY.

UNITED STATES PATENT OFFICE.

WARREN M. STONE, OF CAMDEN, NEW JERSEY.

FLEXIBLE DRIVE CONNECTING DEVICE.

1,385,803.      Specification of Letters Patent.      Patented July 26, 1921.

Application filed September 10, 1920. Serial No. 409,429.

*To all whom it may concern:*

Be it known that I, WARREN M. STONE, a citizen of the United States, residing at Camden, in the county of Camden and State of New Jersey, have invented certain new and useful Improvements in Flexible Drive Connecting Devices, of which the following is a specification.

One object of my invention is to provide improved means which can be interposed between driving and driven members of various characters for the purpose of transmitting the movement from the driving member to the driven member in a flexible yet positive manner and which will eliminate possibility of lost motion and at the same time will serve to absorb or take up the initial shock to the driven member.

Another object is to make the device of my invention of a simple and durable construction and so that it can be readily applied for the purpose intended.

These objects, and other advantageous ends which will be described hereinafter, I attain in the following manner, reference being had to the accompanying drawings in which—

Figure 1 is an outside view showing a device made in accordance with my invention, Fig. 2 is a section taken on the line 2—2 of Fig. 1, Fig. 3 is a section taken on the line 3—3 of Fig. 2, and Fig. 4 is an elevation showing certain of the elements of my invention.

Referring to the drawings, my invention includes a hollow cylinder or cup 5 which has an auxiliary bore 6 which is provided by an external flange 7 and an alined internal flange 8. The opposite end of the cup is externally screw threaded to permit a cap 9 to be screwed thereon such for example as clearly shown in Fig. 2. The cap 9 has an internal flange 10 and is provided with a bore 11 in alinement with and of the same diameter as the bore 6 of the cup 5. A member 12 in the form of a hollow shaft has a portion rotatably fitting the bore 11. This member extends into the housing or casing which is provided by the cup 5 and cap 9 and has its free end 13 rotatably fitting within the bore 6. The member 12 has an external screw thread 14 which is confined between the inner ends of the flanges 8 and 10 so that the member 12 cannot move longitudinally.

A nut or collar 15 is internally screw threaded and is in screw threaded engagement with the screw thread 14 of the member 12. The inner portion of the cup 5 has grooves 16 which in the present instance are shown as being diametrically opposed and the nut or collar 15 has lips 17 which slidably fit within the grooves 16. It is thus obvious that it is impossible for the nut or collar 15 to rotate relatively to the cup 5 but that it can move lengthwise due to the slidable connection between the lips 17 and grooves 16. The cap 9 can be locked to the cup 5 by any suitable means and I have illustrated a spring locked finger 18 adapted to fit within a notch 19 in the cap. A coiled spring 20 is placed between the nut 15 and the cap 9 and another coiled spring 21 is placed between the nut 15 and the end 22 of the cup 5. The nut 15 is thus balanced or held within the confines of the screw thread 14 but it will be understood that if the member 12 is rotated relatively to the cup 5 and cap 9 that the nut 15 will be moved lengthwise within the housing to compress either of the springs 20 or 21 according to the direction in which the member 12 is rotated. The springs 20 and 21 may be made of any desired strength according to the work which the device is supposed to do and for the purpose of illustration it will be considered that the member 12 is connected to driving means and thus occupies the position of a driving member and that the cup 5 through the medium of the bore 6 is connected to a driven member such for example as the shaft 23 which is shown in dot-and-dash lines in Fig. 1.

When the member 12 starts to rotate, the resistance against rotation of the cup 5 will cause the screw thread 14 within the nut to move the nut longitudinally and thereby compress, for example, the spring 21. The spring 21, when compressed to such extent that its resistance becomes as great as the driving power, will prevent further lengthwise movement of the nut 15 relative to the cup 5 and the nut due to the connection between the lips 17 and grooves 16 will cause the cup to rotate to actuate the driven shaft 23. Upon release of the driving power, the spring 21 will expand into its normal position and cause the nut to be returned to its normal position when the load on the driving shaft is released; thus avoiding any possibility of lost motion and at the same time it is obvious that the initial movement of the drive shaft will not abruptly start the driven shaft and as such the structure is desirable in numerous places where it is desired to connect a driving and driven member by flexible connecting means.

While I have specifically described the movement of parts when the driving member is rotated in one direction, it will be understood that the driving member may also be rotated in an opposite direction and in view of the inclusion of the springs 20 and 21, the same action will take place irrespective of the direction of rotation and furthermore it will be understood that the cup 5 or shaft 23 may be used as the driving member in the event of which the member 12 will be the driven member. Thus my invention is applicable for numerous purposes and is operative under a number of varied conditions. For example by providing the hollow shaft 12 with the worm or screw thread 14 inwardly from its end so that portions of the hollow shaft at each side of the screw thread 14 are of equal diameter. The hollow shaft can be reversed in its position so that the end 13 will fit within the bore 11 and the opposite portion of the shaft will fit within the auxiliary bore 6. When in this latter mentioned position the driving and driven members, such for example as the shaft 12 and the flange 7, will be at the same end of the cylinder. Furthermore by making the shaft 12 hollow it can be easily attached to line shafting merely by inserting the line shaft in the hollow shaft and securing the same thereto by any of the well known methods. Also by making the shaft 12 hollow, stationary rigging can be inserted therethrough without any interference and as such the device can be used in connection with the steering means of an automobile. Thus it is obvious that the parts can be readily changed in position so as to make the device serviceable and advantageous in numerous capacities.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. A device of the character described including a rotatable housing having alined bores in its opposite ends; a hollow rotatable shaft having portions fitting said bores, said shaft between said portions having a screw thread and parts abutting the ends of the housing whereby relative longitudinal movement of said shaft and housing is prevented; a collar in screw threaded engagement with said screw thread of the shaft and slidably keyed to said housing; and resilient means opposed between said collar and the opposite ends of said housing; substantially as described.

2. A device of the character described including a housing having a bore in one end; a hollow rotatable shaft fitting said bore and having a screw thread; means for preventing relative longitudinal movement between said shaft and housing, said housing having a bore in its opposite end; a collar in screw threaded engagement with the screw thread on the shaft and being slidably keyed to the housing; and resilient means interposed between said collar and the opposite ends of the casing; substantially as described.

3. A device of the character described including a rotatable housing having alined bores of equal diameter formed in its opposite ends; a hollow shaft having an end portion rotatably fitting in one of said bores and another portion rotatably fitting in the other of said bores and having a screw thread between said portions; a collar fitting the screw thread of said shaft and being slidably keyed to said housing; and resilient means interposed between said collar and opposite ends of said housing; substantially as described.

In testimony whereof I have signed my name to this specification in the presence of two subscribing witnesses.

WARREN M. STONE.

Witnesses:
ELIZABETH GARBE,
CHAS. E. POTTS.